US008935550B2

United States Patent
Tazebay et al.

(10) Patent No.: US 8,935,550 B2
(45) Date of Patent: Jan. 13, 2015

(54) SYSTEM AND METHOD FOR SELECTIVELY PLACING PORTIONS OF A PHYSICAL LAYER INTO LOW POWER MODE

(75) Inventors: Mehmet V. Tazebay, Irvine, CA (US); Bruce Conway, Aliso Vejo, CA (US); Santanu Sinha, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 144 days.

(21) Appl. No.: 13/235,927

(22) Filed: Sep. 19, 2011

(65) Prior Publication Data

US 2012/0191998 A1 Jul. 26, 2012

Related U.S. Application Data

(60) Provisional application No. 61/435,208, filed on Jan. 21, 2011.

(51) Int. Cl.
*G06F 1/26* (2006.01)
*G06F 1/32* (2006.01)
*H04L 12/12* (2006.01)
*H04L 12/835* (2013.01)

(52) U.S. Cl.
CPC .............. *H04L 12/12* (2013.01); *G06F 1/3203* (2013.01); *H04L 47/30* (2013.01); *Y02B 60/35* (2013.01); *Y02B 60/34* (2013.01); *Y02B 60/32* (2013.01)
USPC ........................................................ 713/320

(58) Field of Classification Search
CPC ....... G06F 1/3203; H04L 12/12; H04L 47/30; Y02B 60/32; Y02B 60/34; Y02B 60/35
See application file for complete search history.

(56) References Cited

U.S. PATENT DOCUMENTS

| 6,546,496 | B1 * | 4/2003 | Wang et al. ................... 713/322 |
| 7,194,638 | B1 | 3/2007 | Larky |
| 8,325,603 | B2 * | 12/2012 | Bian et al. ..................... 370/230 |
| 2005/0030808 | A1 * | 2/2005 | Brown et al. ................. 365/222 |
| 2008/0109814 | A1 * | 5/2008 | Park ............................. 718/105 |
| 2008/0126101 | A1 * | 5/2008 | Tamura ......................... 704/500 |

(Continued)

FOREIGN PATENT DOCUMENTS

| CN | 101789877 A | 7/2010 |
| EP | 2 184 890 A1 | 5/2010 |

OTHER PUBLICATIONS

Extended European Search Report, dated May 21, 2012, for European Patent Appl. No. 12000163.1-1244, 6 pages.

(Continued)

*Primary Examiner* — Thomas Lee
*Assistant Examiner* — Zhipeng Wang
(74) *Attorney, Agent, or Firm* — Sterne, Kessler, Goldstein & Fox P.L.L.C.

(57) ABSTRACT

A method and system to dynamically manager power in a communication system are provided herein. The method comprises the steps of monitoring a transmit data queue once every first pre-determined period of time and determining whether the transmit data queue is empty for a pre-determined number of times. The method further includes the step of generating a transition state signal to stop de-queuing of data from the transmit queue if the transmit data queue is empty for the pre-determined number of times and selectively operating portions of a Physical Layer (PHY) that are used for functions other than transmitting and receiving an idle signal in a low power mode.

17 Claims, 5 Drawing Sheets

(56) References Cited

U.S. PATENT DOCUMENTS

| | | | |
|---|---|---|---|
| 2009/0125735 A1* | 5/2009 | Zimmerman | 713/310 |
| 2010/0110952 A1 | 5/2010 | Diab | |
| 2010/0160860 A1* | 6/2010 | Celentano et al. | 604/131 |
| 2010/0262844 A1* | 10/2010 | Diab et al. | 713/300 |
| 2011/0019571 A1* | 1/2011 | Chen et al. | 370/252 |
| 2011/0044170 A1* | 2/2011 | Kure et al. | 370/235 |
| 2011/0047550 A1* | 2/2011 | Tachibana | 718/100 |
| 2011/0110253 A1* | 5/2011 | Ahn et al. | 370/252 |
| 2011/0239031 A1* | 9/2011 | Ware et al. | 713/500 |

OTHER PUBLICATIONS

Office Action directed to related Chinese Patent Application No. 201210016841.2, mailed Apr. 18, 2014; 9 pages.

* cited by examiner

SYSTEM AND METHOD FOR SELECTIVELY PLACING PORTIONS OF A PHYSICAL LAYER INTO LOW POWER MODE

CROSS-REFERENCE TO RELATED APPLICATIONS

This application claims the benefit of U.S. Provisional Application No. 61/435,208, filed Jan. 21, 2011, which is incorporated herein by reference in its entirety.

FIELD OF THE INVENTION

This application is generally related to power management and more specifically to dynamic power management in a communications device.

BACKGROUND OF THE INVENTION

Background Art

In the last decade, the Ethernet networks have been significantly advanced in supported data rates and processing capabilities. These advancements have been made using devices having increased power requirements. Today, Energy Efficient Ethernet (EEE) technology is developing to reduce energy consumption during periods of low link utilization which is known as Low Power Idle (LPI). However, this industrial standard change is envisioned for only new deployments and is not applicable to existing network topologies. Furthermore, the LPI does not provide quick timing recovery from an idle mode thereby introducing latency. Therefore, there is an immediate need for saving energy in existing network topologies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

Figure 4:
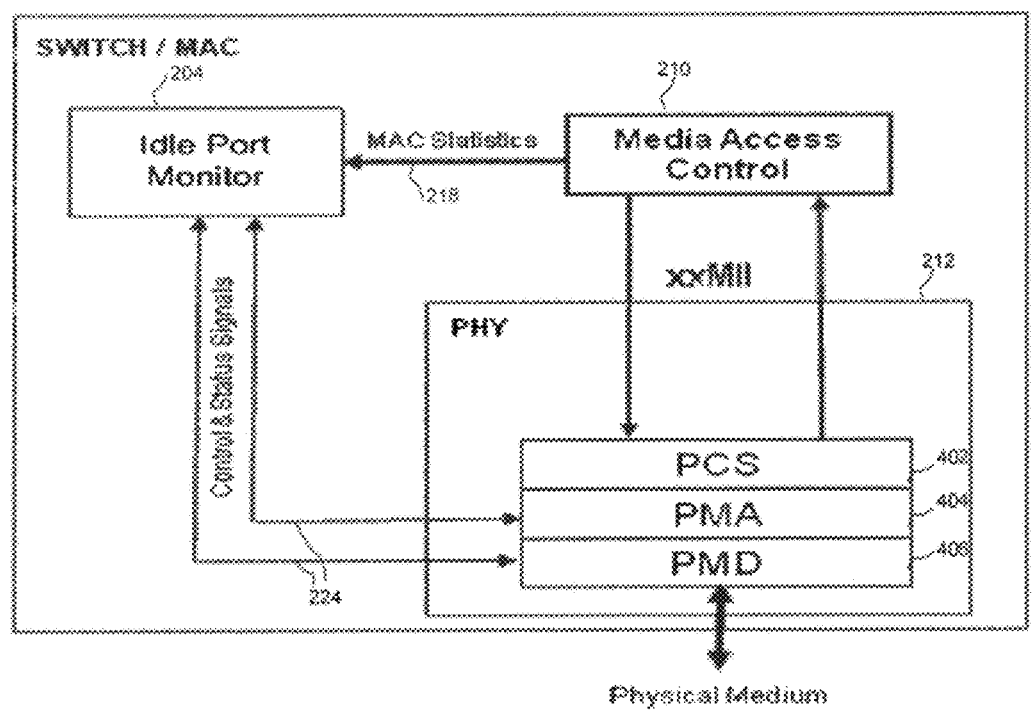

FIG. 4 further illustrates power saving modes in a physical layer (PHY) according to an embodiment of the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

The Institute of Electrical and Electronics Engineers (IEEE) 802.3ab standard does not provide a mechanism for an energy savings mode of operation. This shortcoming was partially addressed in IEEE 802.3az Energy Efficient Ethernet (EEE) standard. IEEE 802.3ab systems implement an "IDLE" mode during which no data signals are transmitted between link partners. However, IEEE 802.3ab requires continuous transmission of an "IDLE" signal between the link partners during the IDLE mode. This IDLE signal allows for quick recovery of timing and clock signals between the link partners upon exit from the IDLE mode. IEEE 802.3az EEE systems do not implement this IDLE mode. IEEE 802.3az EEE systems, implement a Low Power Idle (LPI) mode where a PHY layer periodically transitions between "Refresh" and "Quiet" periods in order to conserve energy. However, LPI has some disadvantages. When a frame is received for transmission from a higher layer in the communication stack, and the link is in LPI mode, a delay is incurred until the link is ready before transmission can begin. LPI mode therefore has a significant latency in resuming transmission when exiting the LPI mode which can compromise the use of EEE switches in low latency applications such as high performance computing clusters etc. This latency has to be minimized for high performance systems. Second, infrastructure utilizing the legacy systems still have a need for power management, cost savings, and timely recovery from sleep modes. Accordingly, embodiments presented herein provide a novel method, system and computer program product to allow for (a) power savings in an IDLE mode, (2) fast recovery from the IDLE mode, and (3) maintaining IDLE signal requirements as required by IEEE 802.3ab standard.

In embodiments presented herein, higher layer control policy algorithms and power management are presented. The processing power of an integrated switch-PHY product is used to provide energy savings and operating expense advantages to the networks which are currently deployed in legacy systems that do not have EEE capabilities and which have minimum latency requirements when recovering from an IDLE mode. Embodiments presented herein can be implemented in software and/or hardware at layers higher than PHY such as a switch or Media Access Control (MAC) layer.

Some of the advantages of the embodiments presented herein include:

a) providing a hardware and/or software mechanism for dynamic power control of the PHY that is transparent to the PHY, b) reducing IDLE and/or data mode power and energy consumption in a packet-network via a control policy that is implemented at a higher layer of a communication stack, c) auto-detection of IDLE/DATA traffic and engaging/disengaging power savings modes, d) configurable power savings mode based-on traffic statistics, e) eliminating/minimizing latency when recovering from the power savings mode, and f) innovating new circuit techniques for power optimization.

Figure 1A:
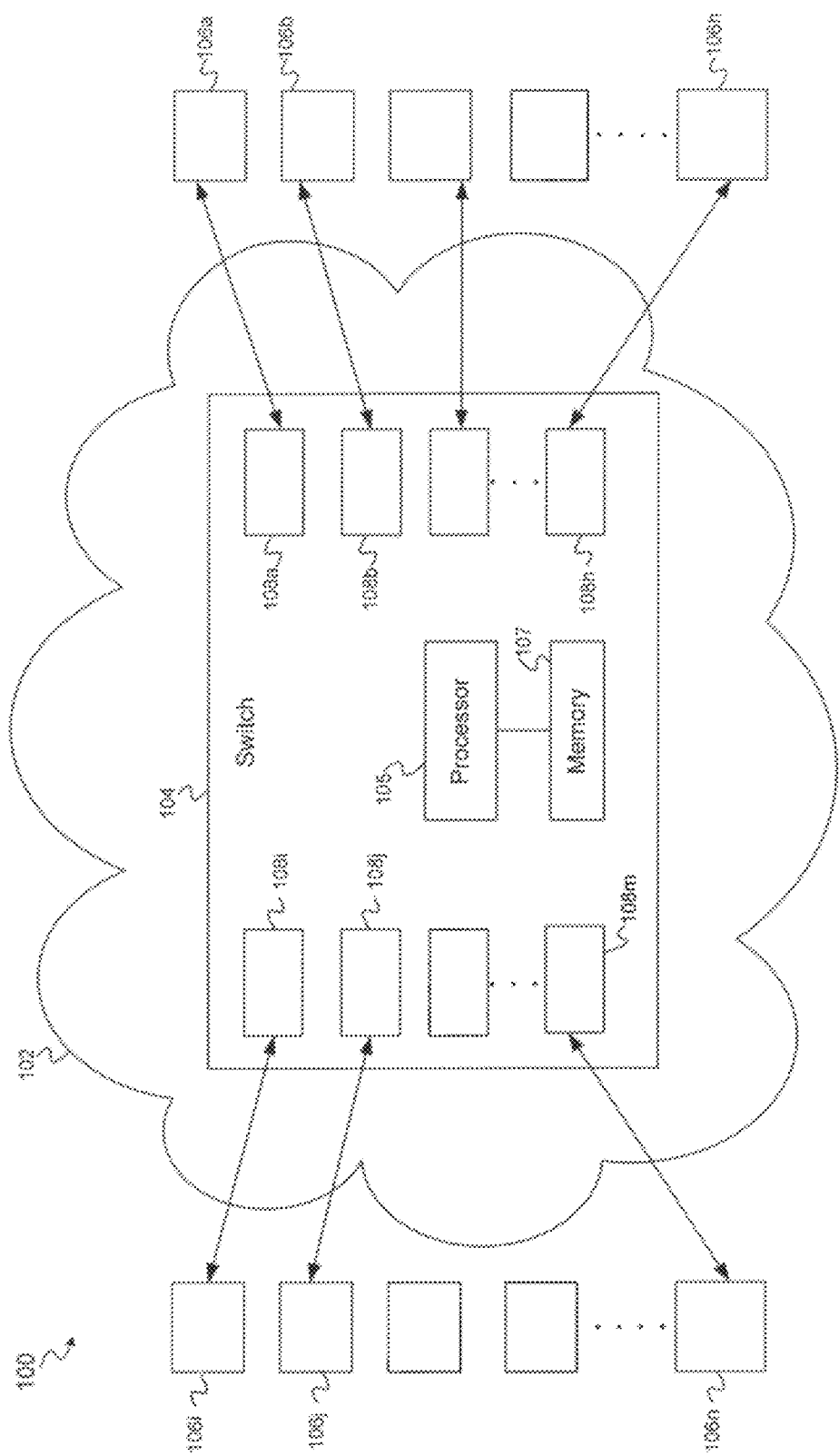
FIG. 1A illustrates an example communication system according to an embodiment of the invention.

FIG. 1A illustrates an example communication system 100 according to an embodiment of the invention. System 100 includes multiple devices 106a-n coupled to network 102. Network 102 includes a switch 104 that routes data between devices 106. Network 102 may be a packet-switched network. it is to be appreciated that the type of network may be arbitrary and the embodiments presented herein are applicable to any wired or wireless network. For example, network 102 may be, including but not limited to, a packet-switched network, a Data Over Cable Service Interface Specification (DOCSIS) network, an IEEE 802.11 or WiFi network, or any combination of these networks.

Switch 104 includes multiple port units 108 to allow for communication with devices 106. Devices 106 and port units 108 are referred to as "link partners" herein. For example, port unit 108a is coupled to device 106a. Device 106a is the link partner to port unit 108a. Similarly, port unit 108a is the link partner to device 106a. In embodiments presented herein devices 106a and port units 108 operate based on the IEEE 802.3ab protocol, but it is to be appreciated that the devices may be based on other protocols. Switch 104 includes a processor 105 coupled to a memory 107. In an example, processor 105 performs the power management control described herein based on instructions stored in memory 107. Embodiments presented herein provide for power management methods and systems that can be implemented in either device 106 or port units 108. Port units 108 may implement an Open System Interconnection (OSI) stack as described below with respect to FIG. 1B.

Figure 1B:
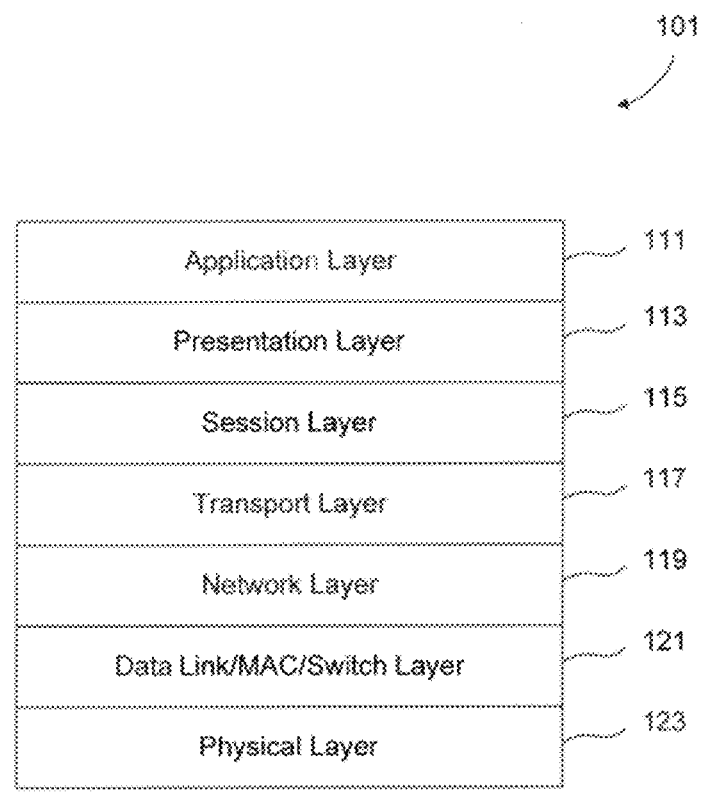
FIG. 1B illustrates an example communication stack according to an embodiment of the invention.

FIG. 1B illustrates an example communication stack 101 according to an embodiment of the invention.

Communication stack 101 is a framework for implementing communication protocols in a hierarchy of seven layers: application layer 111, presentation layer 113, session layer 115, transport layer 117, network layer 119, data link layer 121 and physical layer 123.

Application layer 111 allows a user to access information on a network through an application or program. Common functions at this layer are opening, closing, reading and writing files, transferring files and e-mail messages, executing remote jobs and obtaining directory information about network resources.

Presentation layer 113 provides a standard interface for the application layer 111. For data transmission between different types of computer systems, the presentation layer 113 negotiates and manages the way data is represented and encoded.

Session layer 115 controls the dialogues/connections between computers. It establishes, manages and terminates connections between local applications and remote applications.

Transport layer 117 provides transparent transfer of data between end users, thus relieving the upper layers from any concern while providing reliable data transfer.

Network layer 119 establishes the route between a sender and a receiver across switching points such as, for example, switch 104 and devices 106. An example of a network layer 119 is the Internet Protocol (IP).

Data link/switch/MAC layer 121 is responsible for node to node validity and integrity of the transmission. Transmitted bits are divided into frames, for example, an Ethernet or Token Ring frame in a network.

Physical layer 123 transmits and receives bits from a physical medium such as, for example, twisted pair Ethernet cables. Physical layer 214 deals with electrical and mechanical characteristics of signals and signaling methods.

It is a feature of the embodiments presented herein to provide the control for power management methods at a higher layer for managing power at lower layers. For example, power management software and hardware control is implemented in the MAC layer 121 that controls the power of circuits at the PHY layer 123. In conventional system, power management for PHY layer 123 is implemented in the PHY layer 123 itself. In embodiments presented herein, the control may be implemented at any layer above the PHY layer 123. In alternate embodiments, the control for power management may be implemented in the PHY layer 123 itself. In the example presented in FIG. 1B, the communication stack 101 is an OSI stack. However, it is to be appreciated that stack 101 may be any type of communication stack for example a Systems Network Architecture (SNA) stack or an IEEE 802 stack.

Figure 2:
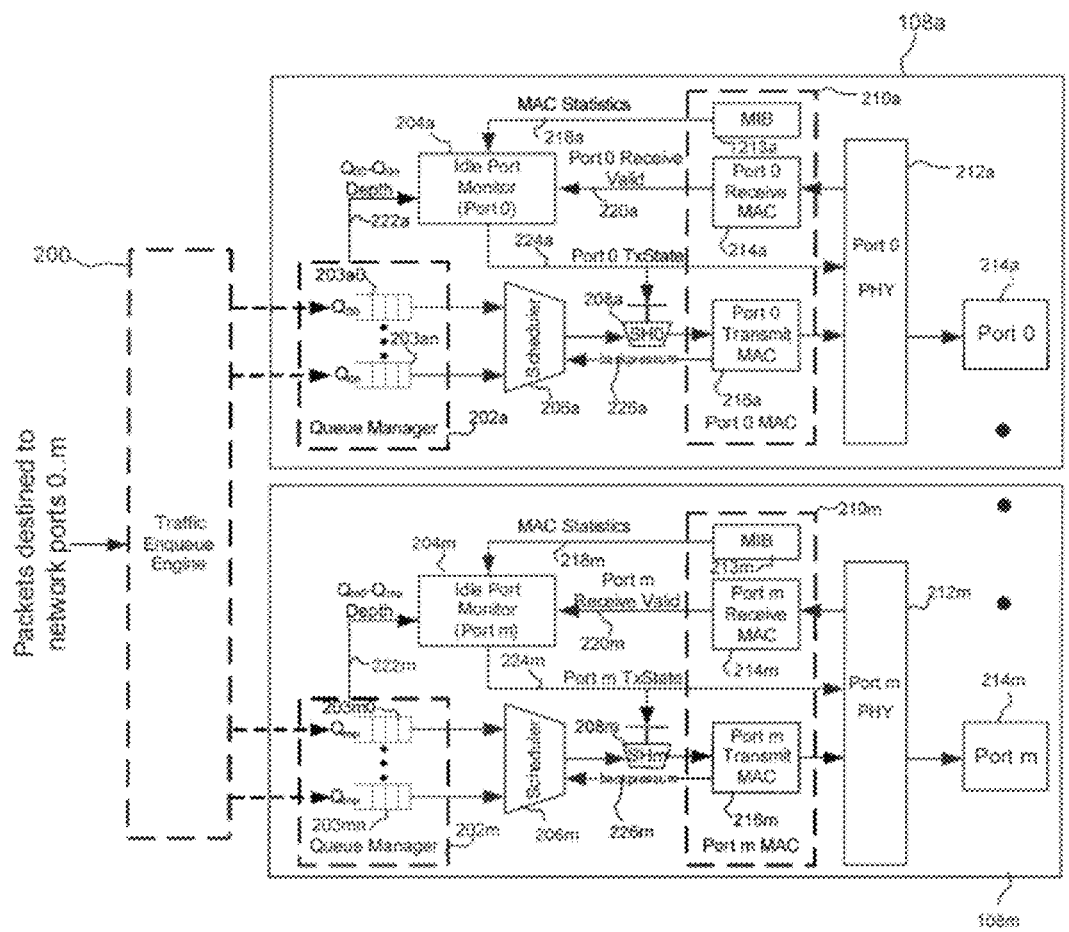
FIG. 2 illustrates details of port units according to an embodiment of the invention.

FIG. 2 further illustrates port units 108 of switch 104 according to an embodiment of the invention.

Each port unit 108 is coupled to a traffic engine 200. Each port unit 108 includes a queue manager 202, an Idle Port Monitor (IPM) 204, a MAC layer 210, a PHY layer 212, a port 214, a scheduler 206 and a shaper 208. MAC layer 210 may be the same as MAC layer 121 and PHY layer 212 may be the same as PHY layer 123 of stack 101.

According to an embodiment of the invention, for each port unit 108, a corresponding IPM 204 triggers the embedded PHY 212 to enter or exit a low power mode. According to an embodiment of the invention, IPM 204 waits for a configurable time period before it engages the power-savings mode without increasing the latency through the system.

Each port unit 108 has multiple queues 203a-n in a queue manager 202. Queues 203 receive packets that are buffered in queues in traffic engine 200. Packets destined to the port 214 are en-queued in queues 203a-n before they are transmitted out on the port 214. For example, queues 203 in queue manager 202a store data destined for transmission via port 214a. Scheduler 206 de-queues packets from the queues 203 when it is time to transmit the packets via port 214. Port shaper 208 "rate-shapes" packet transmissions by deciding when it is time to send a packet from queues 203 to transmit MAC 216 for transmission via a port 214.

In an example, a "PAUSE" packet from a link partner, for example, a device 106, triggers a backpressure signal 226 that commands scheduler 206 to stop packet transmission. Independent of packet transmission, the receive MAC 214 may receive packets from a remote device, for example, a device 106, in a full-duplex link. Beginning of packet reception via port 214 may be indicated by a receive valid signal 220 that is generated by receive MAC 214.

Each IPM 204 implements a control policy in hardware and/or software to trigger an embedded PHY 212 to transition in and out of a low power mode. The low power mode helps conserve power either when the PHY is in an IDLE mode and is transmitting or receiving an IDLE signal to or from a link partner 106. The "low power mode" as described herein refers to operation of the portions of PHY layer 212 in a manner that conserves energy while maintaining signal fidelity for transmission and reception of an IDLE signal to and from a link partner device 106. FIG. 4 illustrates the PHY layer 212 in further detail. PHY layer 212 includes a Physical Coding Sublayer (PCS) layer 402, Physical Medium Attachment (PMA) layer 404 and a Physical Medium Dependent (PMD) layer 406. In embodiments presented herein, portions of PHY 212 are selectively operated in low power mode. For example, transition state signals 224 may only trigger PMA layer 404 and PMD layer 406 into and out of the low power mode. PCS layer 402 may not be operated in low power mode. In an example, analog and digital portions of PHY 212 circuitry, except those responsible for transmission and reception of the IDLE signal, are operated in low power mode. Maintaining the fidelity of the IDLE signal allows for fast transition out of low power mode since timing and recovery circuits remain synchronized with a link partner 106 during the low power mode. In contrast, for system implementing LPI in EEE enabled systems, an additional delay is introduced in resuming transmission from an idle state due to timing recovery operations.

A "normal power mode" as referred to herein is when all portions of PHY 212 are operated at their normal power level.

Transition state signals 224 trigger portions of PHY 212 between low power mode and normal power mode as described further herein.

In an embodiment, an IPM 204 is present in each port unit 108 that supports the low power mode in the embedded PHY 212. IPM 204 may monitor several conditions in switch 104, transition from normal to low power mode, and triggers a low power mode in a corresponding embedded PHY 212. The co-ordination functions implemented by an IPM 204 are determined by a control policy implemented in IPM 204 and described below with respect to the flowchart in FIG. 3. It is to be appreciated that IPM 204 maybe implemented entirely in hardware, entirely in software or in a combination of hardware and software.

In an embodiment, depending on MAC statistics signal 218, IPM 204 generates transition state signal 224 to operate PHY 212 at different levels of power savings by turning off different sections of analog & digital blocks in PHY 212. Additionally, PHY 212 may provide status signals (not shown) to IPM 204 that indicate status of PHY 212 and link quality with a link partner. These signals may be processed by IPM 204 to determine, PHY 212 conditions which may be incorporated into a power control policy of IPM 204. As a result, the system can achieve different levels of power savings along with a robust performance.

According to an embodiment of the invention, IPM 204 may perform the following functions:
 collect traffic statistics and detect when a port has not been transmitting for some amount of time and transition it to a low power mode,
 stop data transmission on the link,
 trigger the PHY 212 to enter a low power mode,
 detect when there is enough data to transmit in queues 203,
 trigger the PHY 212 to come out of the low power mode, and
 re-start data transmission to a link partner.

According to an embodiment of the invention, IPM 204 is configured to generate transition state signal 224 to transition PHY 212 between low power mode and normal power mode. According to an embodiment of the invention, transition state signal 224 places PHY 212 in low power mode based on one or more queue depth signals 222 as described below with respect to the flowchart in FIG. 3. In an example embodiment, transition state signal 224 places PHY 212 in a low power mode based on MAC statistics signal 218 received from MIB unit 213 in MAC 210. MAC statistics signal 218 indicates transmit and receive statistics of port 214. The transmit statistics are the number of packets transmitted via a port 214 and the receive statistics are the number of packets received via a port 214. In an example, if the transmit and receive statistics indicate that port 214 does not transmit or receive data during certain time periods of a day (for example during nighttime), then IPM 204 places PHY 212 into low power mode during the periods of inactivity. In another example, if MAC statistics signal 218 indicates that data is only received during certain periods then IPM 204 places only the transmit portions of PHY 212 circuitry into low power mode during these periods.

According to an embodiment of the invention, transition state signal 214 transitions PHY 212 from low power mode into normal power mode based on queue depth signals 222 and receive valid signal 220 as described below with respect to the algorithm in FIG. 3. The receive valid signal 220 generated by receive MAC 214 indicates the receipt of data via port 214.

Figure 3:
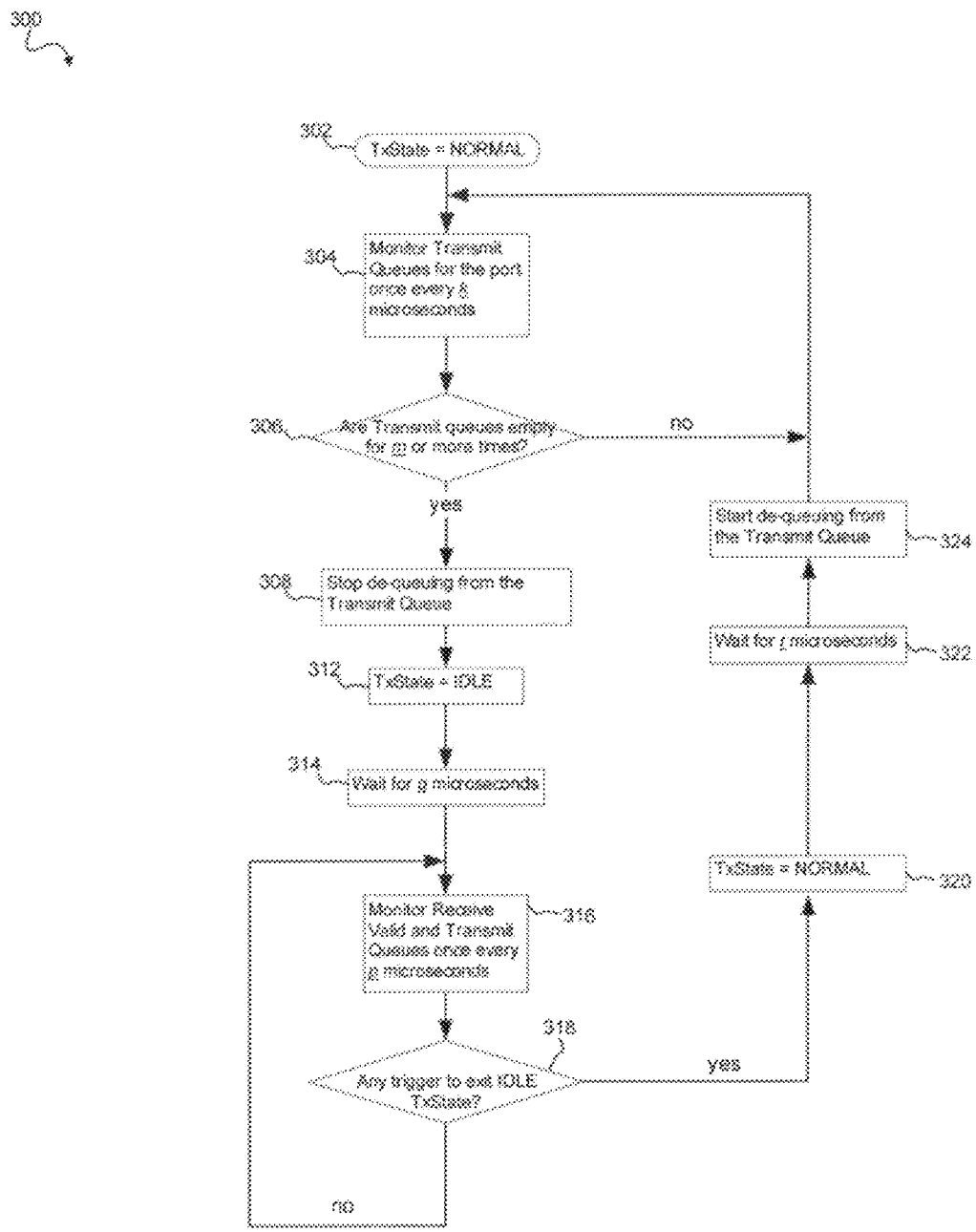
FIG. 3 is a flowchart showing steps performed to transition between a low power mode and a normal power mode according to an embodiment of the invention.

FIG. 3 illustrates an example flowchart 300 showing steps performed to transition PHY 212 between a low power mode and a normal power mode according to an embodiment of the invention. Flowchart 300 will be described with continued reference to the example operating environment depicted in FIGS. 1-2. However, the flowchart is not limited to these embodiments. Note that some steps shown in flowchart 300 do not necessarily have to occur in the order shown. The steps in flow chart 300 may be performed by, for example, by idle port manager 204.

In step 302, the system is in normal power mode. For example, PHY 212 is operating in normal power mode.

In step 304, queue depth signals are monitored once every pre-determined period of time. For example, IPM 204 periodically monitors queue depth signals every k microseconds. The minimum value of k may depend on specific hardware and software implementation and may be determined by the time required to monitor queue depth signals 222.

In step 306, it is determined whether transmit queues are empty for a predetermined number of times. For example, IPM 204 determines whether transmit queues 203 are empty m or more times.

If the transmit queues are not empty for the pre-determined number of times then the process proceeds to step 302 where the system is continued to be operated in normal power mode.

If transmit queues are empty for a pre-determined number of times, then the process proceeds to step 308.

In step 308, de-queuing of data is stopped. For example, transition state signal 208 causes traffic shaper 208 to stop de-queuing data from transmit queues 203.

In step 312, the PHY is transitioned to a low power mode. For example, IPM 204 generates transition state signal 224 to transition PHY 212 to a low power mode.

In step 314, the system waits for a second pre-determined period of time before the next step. For example, IPM 204 waits for "g" microseconds before executing step 316. The wait time of g microseconds may be based on a latency to complete a transition from a normal power mode to a low power mode.

In step 316, queue depth signals and a receive valid signal are monitored every third pre-determined period of time. For example, IPM 204 monitors queue depth signals 222 and receive valid signal 220 every "p" microseconds. The minimum value of p may depend on specific hardware and software implementation of switch 104 and may be determined by the time required to monitor queue depth of multiple transmit queues 203 that are dedicated to a port 214. In another example, IPM 204 only monitors queue depth signal 220 and does not monitor receive valid signal 220.

In step 318, it is determined whether the low power mode is to be exited. For example, if the queue depth signals 222 indicate that the transmit queues 203 are empty and if receive valid signal 220 indicates that no data is being received via port 214, then the process proceeds to step 316. If queue depth signals 222 indicate that data is ready for transmission in one or more transmit queues 203 or if receive valid signal 220 indicates that data is coming in via port 214, then the process proceeds to step 320.

In step 320, the system if transitioned back to normal power mode. For example, IPM 204 generates transition state signal 224 to transition PHY 212 and traffic shaper 308 from low power mode to normal power mode. Transition signal 224 also transitions traffic shaper 208 from low power mode to normal power mode.

In step 322, the system waits for a fourth pre-determined period of time before the next step. For example, IPM 204 waits for "r" microseconds before executing step 324. In an example, the system waits for the fourth pre-determined period of time to allow for data to build up in transmit queues 203 prior to de-queuing data for transmission. The value r may depend on a latency to transition PHY 212 from low power mode to normal power mode.

In step 324, data is de-queued from transmit queues. For example, data is de-queued by scheduler 206 from transmit queues 203 and shaped by traffic shaper 208 for transmission via port 214. The process proceeds to step 304.

The variables k, m, p, q, and r described above may be arbitrary values that can be configured dynamically during operation in real time or can be pre-set prior to system startup.

Embodiments presented herein, or portions thereof, can be implemented in hardware, firmware, software, and/or combinations thereof. The embodiments presented herein apply to any communication system that uses authentication procedures for any type of service.

The representative functions described herein, for example, by IPM 204 or switch 104 can be implemented in hardware, software, or some combination thereof. For instance, the method of flowchart 300 can be implemented using one or more computer processors, such as processor 105 based on instruction stored in memory 107, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the processing functions described herein could be embodied by computer program instructions that are executed by a computer processor, for example processor 105 based on instructions stored in memory 107, or any one of the hardware devices described herein. The computer program instructions cause the processor to perform the instructions described herein. The computer program instructions (e.g. software) can be stored in a computer usable medium, computer program medium, or any storage medium that can be accessed by a computer or processor. Such media include a memory device, such as memory 107, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

Conclusion

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system to manage power, comprising:
a port to transmit and receive data;
a Media Access Control (MAC) layer;
a physical layer (PHY) coupled to the port;
a queue manager including a plurality of transmit queues and configured to send a queue depth signal to the idle port monitor that indicates whether one or more of the transmit queues have data for transmission; and
an idle port monitor, coupled to the port and the PHY, and configured to monitor the queue depth signal once every pre-determined period of time, determine whether the one or more transmit queues are empty for a pre-determined number of times based on the queue depth signal, receive a signal from the Media Access Control (MAC) layer, and generate a transition state signal based on the queue depth signal and the signal received from the MAC layer to selectively cause portions of a Physical Medium Attachment (PMA) layer and a Physical Medium Dependent (PMD) layer of the PHY to operate in a low power mode.

2. The system of claim 1, wherein the port is active if the port is transmitting or receiving data.

3. The system of claim 1, wherein the idle port monitor is configured to determine that the port is active if the queue depth signal indicates that a queue has data for transmission and to determine that the port is inactive if the queue depth signal indicates that no queue has data for transmission.

4. The system of claim 1, wherein the idle port monitor is configured to wait a second pre-determined period of time and monitor a receive valid signal from the MAC layer and the queue depth signal every third pre-determined period of time and send the transition state signal to the PHY to operate the PHY in a normal mode if the receive valid signal indicates receipt of data via the port or the queue depth signal indicates that one or more transmit queues has data to transmit.

5. The system of claim 1, further comprising:
a traffic shaper configured to de-queue data from transmit queues if the transition state signal indicates a normal power mode and to stop de-queuing data from the transmit queues if the transition state signal indicates the low power mode.

6. The system of claim 1, wherein the idle port monitor is implemented in a layer of a communication stack that is higher than the PHY layer.

7. The system of claim 1, wherein the MAC layer includes:
a receive MAC unit configured to send a receive valid signal to the idle port monitor to indicate receipt of data via the port from a link partner; and
a statistical unit configured to send transmit and receive statistics to the idle port monitor, wherein the transmit statistics are a number of packets transmitted via the port and the receive statistics are a number of packets received via the port;
wherein the idle port monitor is configured to selectively place portions of the PHY into the low power mode or a normal mode based on the receive valid signal, the transmit and receive statistics, and the queue depth signal that indicates whether data is present in transmit queues for transmission.

8. The system of claim 1, wherein in the low power mode, analog and digital portions of the PHY that transmit or receive an idle signal from the link partner are operated in a normal power mode and other analog and digital portions of the PHY are operated in the low power mode.

9. The system of claim 1, wherein the system conforms to the IEEE 802.3ab protocol.

10. A method to manage power, comprising:
monitoring a transmit data queue every pre-determined period of time;
determining whether the transmit data queue is empty for a pre-determined number of times within the pre-determined period of time;
receiving a signal from a Media Access Control (MAC) layer;
generating a transition state signal to stop de-queuing of data from the transmit queue based on the signal received from the MAC layer and when the transmit data queue is empty for the pre-determined number of times; and
selectively operating portions of a Physical Medium Attachment (PMA) layer and a Physical Medium Dependent (PMD) layer of a Physical Layer (PHY) that are used for functions other than transmitting and receiving an idle signal in a low power mode, based on the generating of the transition state signal.

11. The method of claim 10, further comprising: operating portions of the PHY layer in low power mode if no data is being received via a port.

12. The method of claim 10, after the selectively operating step, further comprising: monitoring the transmit queue once every second pre-determined period of time to determine whether the transmit queue has data for transmission.

13. The method of claim 10, further comprising: monitoring a receive valid signal once every second pre-determined period of time to determine whether data is being received via a port.

14. The method of claim 13, further comprising: generating the transition state signal to cause the portions of the PHY layer operating in the low power mode to operate in a normal power mode if the transmit queue has data for transmission or if the receive valid signal indicates that data is being received via the port.

15. The system of claim 1, wherein the idle port monitor is configured to operate a Physical Coding Sublayer (PCS) layer of the PHY in a normal power mode based on the transition state signal.

16. The method of claim 10, further comprising operating a Physical Coding Sublayer (PCS) layer of the PHY in a normal power mode based on the transition state signal.

17. A system to manage power, comprising:
a memory;
a queue manager including a plurality of transmit queues and configured to send a queue depth signal to an idle port monitor that indicates whether one or more of the transmit queues have data for transmission; and
a processor coupled to the memory and based on instructions stored in the memory, the processor configured to:
monitor the queue depth signal once every pre-determined period of time:
determine whether the one or more transmit queues are empty for a pre-determined number of times based on the queue depth signal;
receive a signal from a Media Access Control (MAC) layer; and
generate a transition state signal based on the queue depth signal and the signal received from the MAC layer to selectively operate portions of a Physical Medium Attachment (PMA) layer and a Physical Medium Dependent (PMD) layer of a physical layer (PHY) in a low power mode and to operate a Physical Coding Sublayer (PCS) layer of the PHY in a normal power mode.

* * * * *

UNITED STATES PATENT AND TRADEMARK OFFICE
CERTIFICATE OF CORRECTION

PATENT NO. : 8,935,550 B2  
APPLICATION NO. : 13/235927  
DATED : January 13, 2015  
INVENTOR(S) : Tazebay et al.

Page 1 of 1

It is certified that error appears in the above-identified patent and that said Letters Patent is hereby corrected as shown below:

In the Claims

Column 8, line 33, "physical layer" is replaced with --Physical Layer--.

Column 10, line 43, "physical layer" is replaced with --Physical Layer--.

Signed and Sealed this  
First Day of September, 2015

Michelle K. Lee  
*Director of the United States Patent and Trademark Office*